the rim 26 on which the tire 28 is mounted to the rear hub 30 rotatably mounted upon the axle 32 supported by the upper and lower rear forks 34 and 36 and driven by the usual sprocket chain 38 by means of a driven sprocket (not shown) connected to the hub 30 and a drive sprocket 40 rotated by the shaft 42 through the usual cranks 44 carrying pedals 46 pivotally mounted thereon. The bicycle 12 is conventional and its details are outside the scope of the present invention.

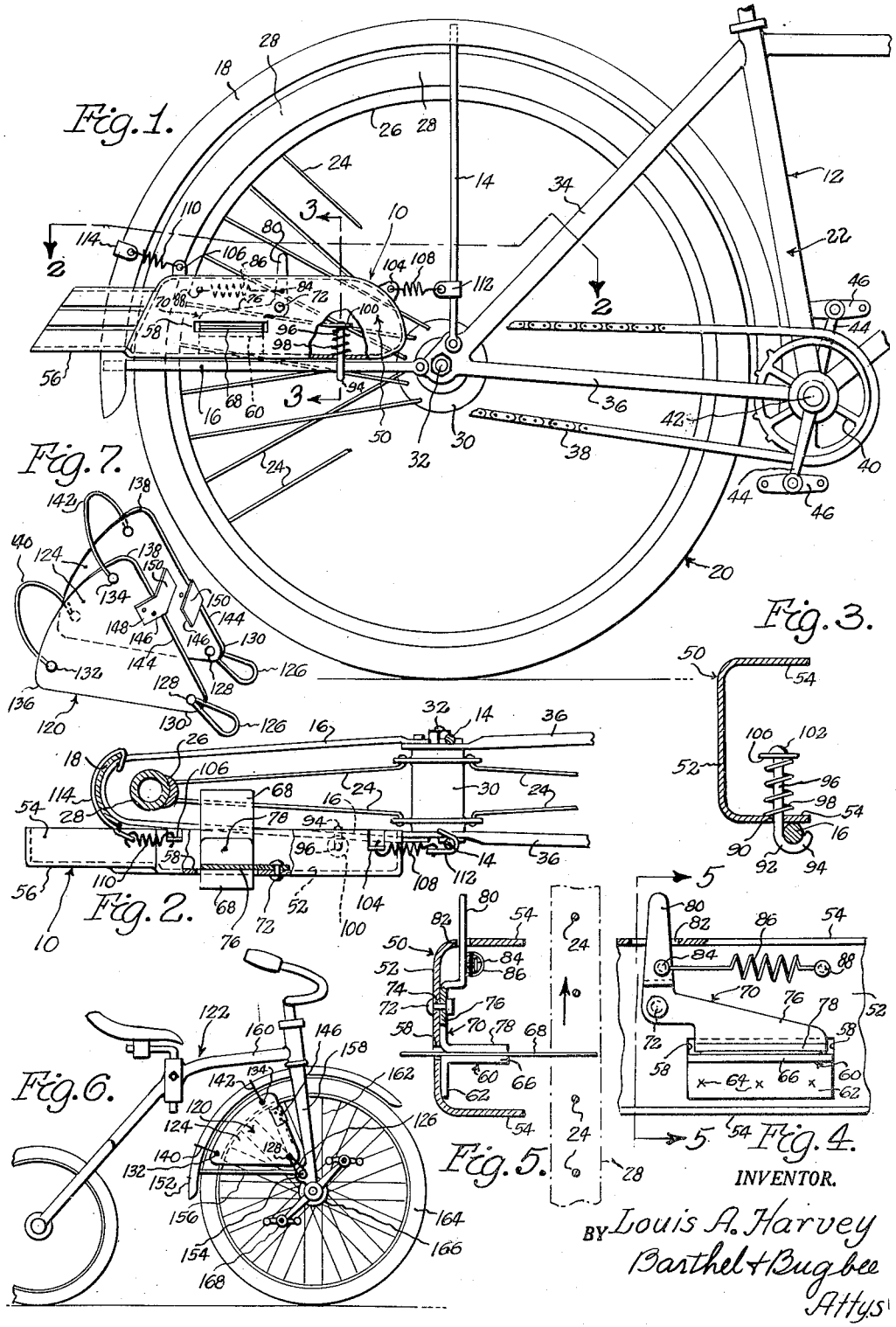

2,768,474

MOTOR-SIMULATING DEVICE FOR CYCLES

Louis A. Harvey, Detroit, Mich.

Application July 19, 1954, Serial No. 444,030

2 Claims. (Cl. 46—175)

This invention relates to noise-making toys and, in particular, to a motor-simulating device for cycles.

One object of this invention is to provide a cycle motor-simulating device wherein a stiff flexible object or clacker, such as a card, is clamped in a holder secured to a cycle, such as a bicycle or tricycle, in such a manner that it projects into engagement with the spokes of one of the cycle wheels, so as to produce a fluttering noise simulating the explosions of a tiny gasoline motor.

Another object is to provide a cycle motor-simulating device of the foregoing character wherein the holder for the clacker also serves as a sounding board for amplifying the sound emitted by the card engaging the spokes of the wheel.

Another object is to provide a cycle motor-simulating device of the foregoing character which is quickly and easily attached to the fender supports of a bicycle or tricycle without requiring special construction or alteration thereof, or the use of special tools.

Another object is to provide a cycle motor-simulating device of the foregoing character wherein the casing of the device is of a shape simulating that of a gasoline motor, yet which also serves as a sounding board.

Another object is to provide a cycle motor-simulating device of the foregoing character which is of simple and inexpensive construction, preferably employing stampings which are easily produced on a mass production scale.

Other objects and advantages of the invention will become apparent during the course of the following description of the accompanying drawing, wherein:

Figure 1 is a side elevation of the rearward part of a cycle showing a cycle motor-simulating device mounted thereon, according to one form of the invention, with portions broken away to show the interior construction;

Figure 2 is a horizontal section through the cycle of Figure 1, taken along the line 2—2 therein and showing the motor-simulating device mainly in top plan view, with portions broken away to show the interior construction;

Figure 3 is a vertical section taken along the line 3—3 in Figure 1, showing one means for securing the device to one of the fender rods;

Figure 4 is a fragmentary side elevation of the card-clamping arrangement looking in the opposite direction from the side elevation of Figure 1;

Figure 5 is a vertical section taken along the line 5—5 in Figure 4;

Figure 6 is a side elevation of a modified cycle motor-simulating device, as attached to a child's tricycle; and Figure 7 is an enlarged perspective view of the motor-simulating device shown in Figure 6.

Referring to the drawings in detail, Figure 1 shows a cycle motor-simulating device, generally designated 10, attached to a bicycle, generally designated 12, by being secured to the struts 14 and 16 of the rear fender 18 which arches over the rear wheel 20 in the usual way and is secured at its forward end to the bicycle frame 22. The wheel 20 is provided with the usual spokes 24 extending The motor-simulating device 10 includes a dished or pan-shaped casing, generally designated 50, having a sounding board wall 52 partly surrounded by a peripheral flange 54 (Figures 3 and 5). The casing 50 at its rearward end is provided with an extension 56 extending rearward therefrom and shaped roughly to the form of exhaust pipes. The sounding board 52 adjacent the outer ends of the spokes 24 is provided with an elongated slot 58 beneath which is mounted an elongated card rest 60 of L-shaped cross-section having a vertical flange 62 welded as at 64 to the sounding board 52 and having an elongated horizontal flange 66 serving as a support for a clacker, such as a stiff flexible resilient card 68. The slot 58 in the side of the motor-simulating device 10 enables the noise-making card or clacker 68 to be quickly and easily changed or replaced whenever the user desires to do so. The clacker 68 may be formed of cardboard, spring steel, sheet plastic or other suitable noise-making material, and is held in position by a clamping lever, generally designated 70, which is pivotally mounted on the pivot pin 72 secured as at 74 to the sounding board 52 (Figure 5). The lower arm 76 of the clamping lever 70 is provided with a horizontal flange 78 extending outward parallel to the stationary flange 66. The handle arm 80 of the clamping lever 70 is offset relatively to the clamping arm 76 and extends through an elongated slot 82 in the casing flange 54 so as to be conveniently grasped by the user. The handle arm 80 is provided with an anchor pin 84 for one end of a tension spring 86, the opposite end of which is secured to an anchor pin 88 mounted on the sounding board 52 of the casing 50 (Figure 4).

The lower portion of the casing flange 54 (Figure 3) is drilled as at 90 for the passage of a J-shaped hook 92, the curved end 94 of which hooks around the rear fender strut 16. The shank 96 of the hook 92 passes through the hole 90 and is urged upward by a compression spring 98. The lower end of the spring 98 engages the lower portion of the flange 54 as a fixed abutment, whereas the upper end thereof engages an abutment washer 100 mounted on the shank 96, which terminates in a head 102.

Struck up from the forward and rearward ends of the upper portion of the flange 54 are two spring anchoring ears 104 and 106 respectively serving as anchorages for tension springs 108 and 110. The forward end of the forward spring 108 is connected to a sheet metal hook 112 which is hooked around the vertical fender strut 14. The rearward end of the rearward spring 110, on the other end is connected to a sheet metal hook 114 (Figures 1 and 2) which is hooked around the edge of the fender 18 remote from the spring 110 and closely follows the contour of the fender 18 to the opposite edge thereof.

The motor-simulating device 10 is attached to the cycle 12 by placing the casing 50 thereof alongside the wheel 20 so that the lower portion of the flange 54 lies immediately above the horizontal fender strut 16. The spring-urged hook 92 is then pushed downward by placing a finger on the head 102, so as to hook under and grip the fender strut 16 (Figure 3). The forward hook 112 is then extended to grip the vertical fender strut 14 and the rearward hook 114 is similarly hooked around the rearward portion of the fender 18 (Figure 2).

In the use of the motor-simulating device 10, the user pushes the clacker-clamping lever handle 80 forward to raise the clamp 78 while he inserts a clacker, such as a flexible resilient card 68 of sheet steel, sheet plastic, cardboard or the like through the slot 58 across the horizontal flange 66 of the clacker support 60 so that the clacker 68 projects into the path of the bicycle wheel spokes 24 (Figure 2). He then releases the handle 80, whereupon the spring 86 pulls the clamp 78 into firm engagement with the card 68, pushing it downward against the card support 66. The user then rides the bicycle 12 in the usual way, propelling it by means of the pedals 46 on the cranks 44. The consequent rotation of the rear wheel 20 causes the spokes 24 to rapidly pass the end of the clacker 68, snapping the clacker forward until it is released by the spoke. The clacker 68 snaps back against the next spoke, making a sharp crack. The composite effect of the rapid rotation of the wheel 20 is a sharp rattling or fluttering sound which simulates a small toy motor and consequently has a considerable entertainment value to the child riding the bicycle.

When the clacker loses is resilience or is torn or damaged, it is easily replaced by operating the clacker clamping lever 70 in the foregoing manner, removing the damaged card and replacing it with a fresh clacker. Ordinary playing cards from a discarded pack have been found very satisfactory for use as a clacker.

The modified motor-simulating device, generally designated 120, shown in Figures 6 and 7, is a simplified form of the invention shown in Figures 1 to 5 inclusive and is particularly intended for attachment to a child's tricycle 122. The device 120 consists of a pair of roughly triangular plates 124 of metal, sheet plastic, cardboard or the like having elastic loops 126 attached as at 128 to their forward lower corners 130. Attached as at 132 and 134 respectively to the rearward lower and upper corners 136 and 138 of the plates 124 are resilient cross-loops 140 and 142 respectively. Riveted or otherwise secured to the peripheries 144 of the plates 124 are L-shaped clackers in the form of cards of sheet members 146, the inner arms 148 of which are secured to the plates 124 and the outer arms 150 of which project toward one another.

The motor-simulating device 120 is attached to the tricycle 122 by placing the plates 124 on opposite sides thereof with the cross loops 140 and 142 extending over and around the front fender 152 thereof and with the lower loops 126 hooked over the bolts 154 by which the fender strut 156 is secured to the front fork 158 of the tricycle frame 160. The arms 150 of the clackers 146 thus project into the path of the spokes 162 of the front wheel 164, the front hub 166 of which is rotated by the pedals 168 attached to the cranks 170 in the usual way.

In the operation of the modified motor-simulating device 120, the rotation of the front wheel 164 causes its spokes 162 to snap the clacker arms 150 against the following spokes with a rattling or fluttering sound which is also very entertaining to the youthful rider. The device 120 is intended to be a less expensive form of the invention, suitable for manufacture from cheap materials such as stiff cardboard or sheet metal, and is especially adapted to be given away as an advertising novelty.

It will be evident from Figures 1 and 7 that the sounding board wall 52 of Figure 1 or the plates 124 may be ornamented to still further simulate a motor by printing or embossing thereon designs resembling such a motor.

What I claim is:

1. A motor-simulating device adapted to be attached to the frame structure of a cycle having a spoked wheel and a fender structure therefor, said device comprising a plate adapted to be disposed in a substantially vertical plane beside the spoked wheel and fender structure, clamping means connected to said plate and engageable with one of said structures for securing said plate to one of said structures adjacent the spoked wheel and fender structure, and a clacker secured to said plate and projectible therefrom into the path of the spokes of said wheel.

2. A motor-simulating device adapted to be attached to the frame structure of a cycle having a spoked wheel and a fender structure therefor, said device comprising a pair of plates adapted to be disposed in laterally-spaced substantially parallel vertical planes on opposite sides of the spoked wheel and fender structure, clamping means connected to said plates and engageable with one of said structure for securing said plates to one of said structures adjacent the spoked wheel and fender structure, plate-interconnecting means secured to said plates and extending around said fender structure and a clacker secured to each plate and projectible therefrom into the path of the spokes of said wheel.

References Cited in the file of this patent
UNITED STATES PATENTS

| | | |
|---|---|---|
| 2,603,035 | Countryman | July 15, 1952 |
| 2,609,640 | Newell | Sept. 9, 1952 |
| 2,624,156 | Meyer | Jan. 6, 1953 |